(12) United States Patent
Rollins et al.

(10) Patent No.: US 8,376,088 B2
(45) Date of Patent: Feb. 19, 2013

(54) TWIN LUBRICATION TANK FILLING SYSTEM

(75) Inventors: Michael J. Rollins, Lakeside, CA (US); Mark N. Shatz, San Diego, CA (US); Jeffrey C. Brill, Poway, CA (US)

(73) Assignee: Pratt & Whitney, East Hartford, CT (US)

( * ) Notice: Subject to any disclaimer, the term of this patent is extended or adjusted under 35 U.S.C. 154(b) by 206 days.

(21) Appl. No.: 12/786,333

(22) Filed: May 24, 2010

(65) Prior Publication Data

US 2010/0230003 A1 Sep. 16, 2010

Related U.S. Application Data

(62) Division of application No. 11/358,662, filed on Feb. 20, 2006, now abandoned.

(51) Int. Cl.
*F01M 11/12* (2006.01)
*E03B 11/00* (2006.01)
*F16K 31/18* (2006.01)

(52) U.S. Cl. .................. 184/103.1; 184/103.2; 137/256; 137/264; 137/432; 137/574

(58) Field of Classification Search ............... 184/103.1, 184/103.2, 14, 66, 105.1, 70, 106; 137/429, 137/430, 432, 256, 264, 433, 574; 141/198, 141/238, 247

See application file for complete search history.

(56) References Cited

U.S. PATENT DOCUMENTS

| | | | | | |
|---|---|---|---|---|---|
| 518,306 | A | * | 4/1894 | Clark | 141/198 |
| 1,580,493 | A | * | 4/1926 | Johnson | 137/260 |
| 2,311,499 | A | * | 2/1943 | West et al. | 137/424 |
| 2,350,061 | A | * | 5/1944 | Porter | 417/85 |
| 2,670,889 | A | * | 3/1954 | Heckendorf | 141/35 |
| 3,825,042 | A | * | 7/1974 | Glantz | 141/95 |
| 4,313,459 | A | * | 2/1982 | Mylander | 137/416 |
| 5,049,270 | A | * | 9/1991 | Carrano et al. | 210/248 |
| 5,787,942 | A | * | 8/1998 | Preston et al. | 141/198 |
| 6,719,021 | B1 | * | 4/2004 | Jwu | 141/331 |
| 7,308,919 | B1 | * | 12/2007 | Zavala | 141/247 |
| 2002/0023678 | A1 | * | 2/2002 | Takahashi et al. | 137/433 |

* cited by examiner

*Primary Examiner* — Michael Mansen
*Assistant Examiner* — Minh Truong
(74) *Attorney, Agent, or Firm* — Stephen G. Mican

(57) ABSTRACT

A twin lubrication oil tank filling system with a single oil fill port that prevents overfilling of both a primary oil tank and a secondary oil with a gravity fill system by directing oil primarily into the secondary oil tank by means of a special oil diverter, a float valve for the secondary oil tank that closes when the oil level in the secondary tank reaches a full level to cause additional oil flow to pour into the primary oil tank and a float valve for the primary oil tank that closes when the oil level in the primary tank reaches a full level.

15 Claims, 4 Drawing Sheets

TWIN LUBRICATION TANK FILLING SYSTEM

CROSS REFERENCE TO RELATED APPLICATIONS

This is a Divisional Patent Application for the patent application Ser. No. 11/358,662 filed 20 Feb. 2006 that claims the benefit of the filing date there for.

FIELD OF THE INVENTION

The invention relates to lubrication systems for machinery, and more particularly to a twin lubrication oil tank filling system with a common lubrication oil fill port for machinery that requires two separate lubrication oil systems.

BACKGROUND OF THE INVENTION

A gearbox assembly to couple a prime mover to a load generally requires a lubrication system for lubricating its gears and bearings with lubrication oil. For example, an aeronautical auxiliary power unit (APU) has such a gearbox that connects a prime mover in the form of a gas turbine engine to loads such as a load compressor, electric generator and hydraulic pump. A lubrication oil tank generally mounts within the gearbox housing to provide a reservoir of such lubrication oil for the gearbox lubrication system.

Loads coupled to the gearbox may have their own lubrication system. For instance, the generator connected to such a gearbox may require lubrication by means of a lubrication system using lubrication oil stored in a lubrication oil tank. When the gearbox and generator are of such design that their lubrication systems integrate together, it is usual practice to provide a single lubrication oil tank as a reservoir for both the gearbox and the generator.

When a gearbox design requires separate oil systems for the gearbox and the generator, each system with a separate oil tank but with a common oil fill port, it is difficult to insure that both tanks fill with lubrication without overfilling one tank or the other. To prevent overfill, some means must be included for periodically filling both tanks with lubrication oil simultaneously without overfilling either.

A problem with this design has been that the float valves with internal floats to perform the tank closing operations do not perform the closing operation as required. In particular, although the valve floats generally close the tanks upon filling as required, they tend to stick in the closed position after shutting, thereby interfering with refilling of the tanks. Therefore, there is a need for valves that function to seal the generator and gearbox tanks in sequence to prevent overfilling either tank and do not stick in the closed position.

SUMMARY OF THE INVENTION

The invention comprises a twin lubrication oil tank filling system with a single oil fill port that prevents overfilling a primary oil tank and a secondary oil tank. A gravity fill system directs oil to flow primarily into the secondary oil tank. A float valve for the secondary oil tank closes when the lubrication oil reaches a full level in the secondary tank and forces additional oil flow to pour into the primary oil tank. A float valve for the primary tank closes when the lubrication oil reaches a full level in the primary tank, and any additional oil flow spills out the oil fill port. The float valves may comprise a special float valve that has a generally annular float that slides upon a generally cylindrical support member with oil fill holes. As the oil level rises, so does the float until it covers the oil fill holes, thereby terminating flow.

In one possible embodiment, the invention comprises a twin lubrication oil tank filling system with a single oil fill port that prevents overfilling of both a primary oil tank and a secondary oil tank, comprising: a gravity fill system comprising an oil diverter that directs lubrication oil primarily into the secondary oil tank; a float valve for the secondary oil tank to close oil flow into the secondary tank when the lubrication oil reaches a full level in the secondary tank and causes additional oil flow to pour into the primary oil tank; and a float valve for the primary oil tank to close oil flow into the secondary tank when the lubrication oil reaches a full level in the primary oil tank.

DETAILED DESCRIPTION OF THE INVENTION

Figure 1:
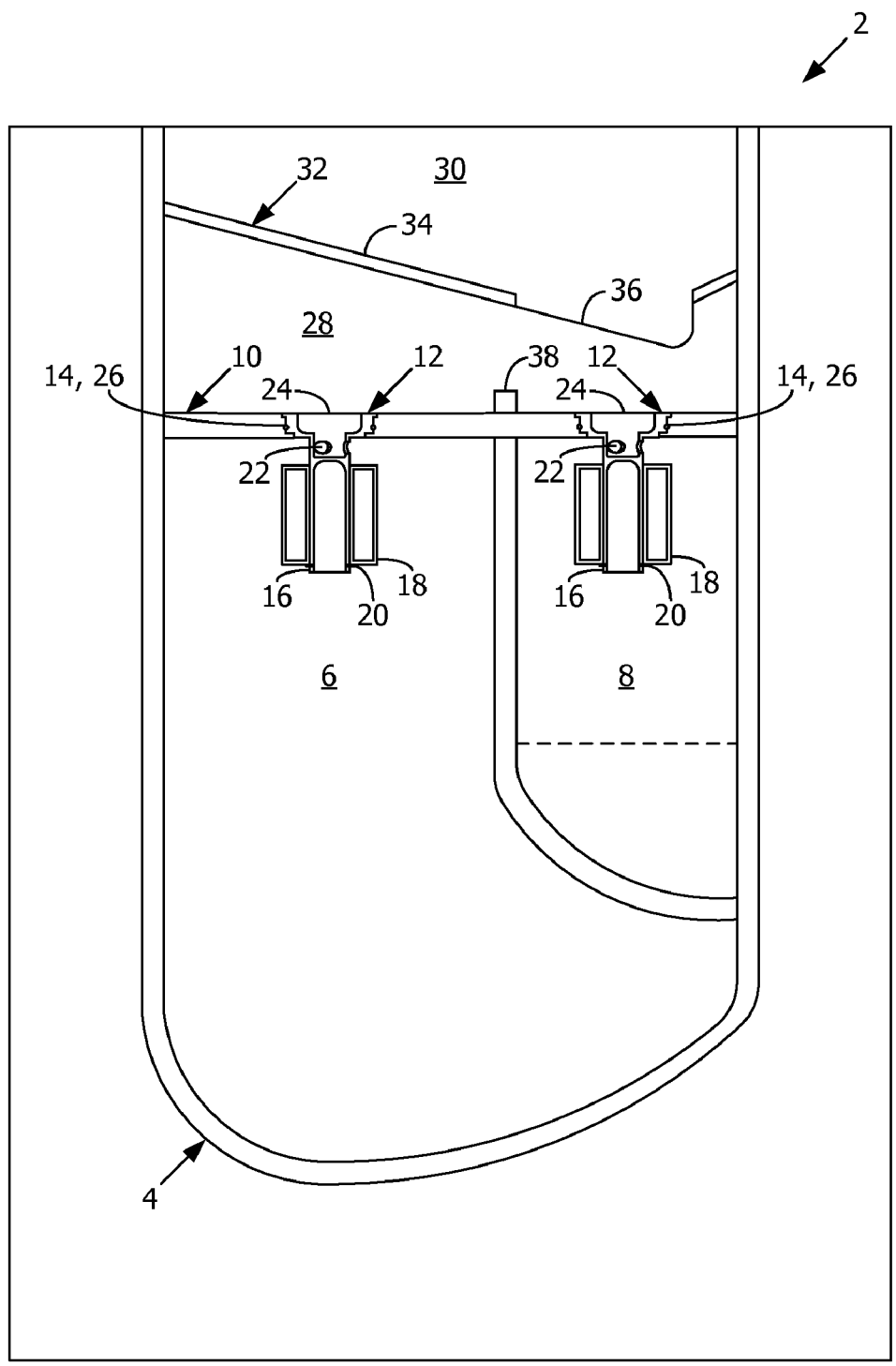
FIG. 1 is a cut-away side view of a gearbox that incorporates a twin lubrication oil tank filling system with a primary oil tank and a secondary oil tank according to one possible embodiment of the invention that shows the primary oil tank only partially full and the secondary oil tank empty.

FIG. 1 is a cut-away side view of machinery, such as a gearbox 2, that incorporates a twin lubrication oil tank filling system 4 according to one possible embodiment of the invention. By way of example as illustrated, the gearbox 2 is designed for an aeronautical APU, but the gearbox 2 may be configured for any other application where it may be used to couple a prime mover to a load. The twin tank filling system 4 comprises a primary oil tank 6 to supply oil for the gearbox 2 and a secondary oil tank 8 to supply oil to at least one load or accessory attached to the gearbox 2, such as a generator (not shown).

The primary oil tank 6 and the secondary oil tank 8 have a "full" level at the same height as controlled by a baffle plate 10 common to both the primary oil tank 6 and the secondary oil tank 8. A float valve 12 sits in the primary oil tank 6. Another float valve 12 sits in the secondary oil tank 8. Each float valve 12 mounts in a mating aperture 14 that passes through the baffle plate 10.

Figure 2:
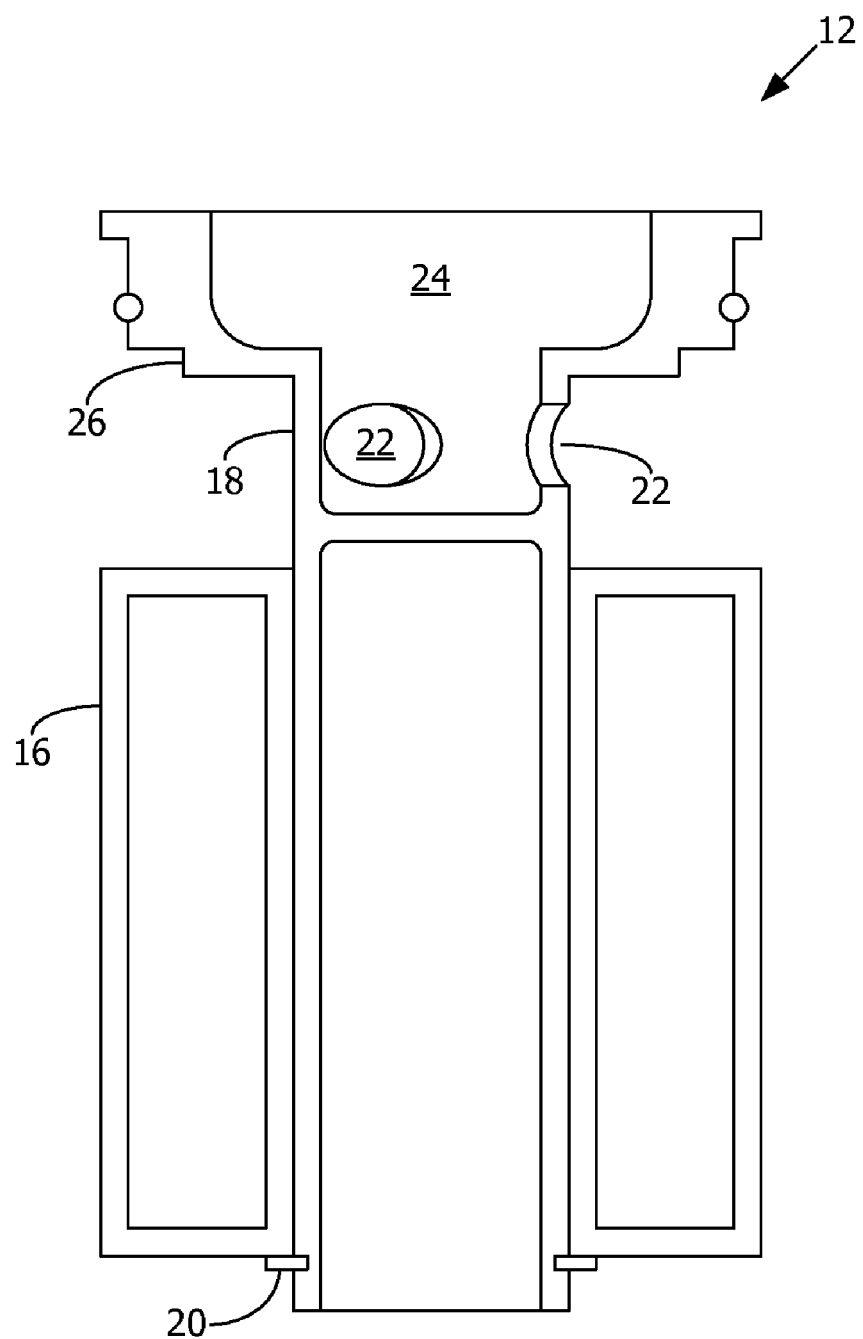
FIG. 2 is a cut-away side view of one possible embodiment of a float valve with an external float according to the invention.

FIG. 2 is a cut-away side view of one possible embodiment of a float valve 12 with an external float according to the invention. It is understood, however, that the present invention could utilise other types of float valves. A generally annular exterior float 16 slides along a generally cylindrical float support member 18. A float stop 20, such as a retainer ring attached to the support member 18 as shown, protrudes near a lower end of the support member 18 to limit travel of the float 16 beyond the lower end of the support member 18. The support member 18 has at least one aperture 22, and preferably three as shown. Each aperture 22 passes through at least a portion of the support member 18 to communicate with a float valve inlet port 24 that passes through a mounting flange 26 on an upper end of the float 12. The mounting flange 26 has a shape that is suitable for mounting to its mating aperture 14 in the baffle 10.

As the float 16 starts to float due to a rising oil level, it slides upward along the support member 18 toward the mounting flange 26, it starts to cover the apertures 22, thereby blocking any fluid communication between the inlet port 24 and the apertures 22. This condition occurs when the primary oil tank 6 or the secondary oil tank reaches a "full" level established by the baffle 10. As the oil level decreases, such as by consumption, the float 16 slides downward along the support member 18 away from the mounting flange 26, thereby uncovering the apertures 22 and restoring fluid communication between the inlet port 24 and the aperture 22.

FIG. 1 shows the gearbox 2 with the primary oil tank 6 only partially full and the secondary oil tank 8 empty. The floats 16 for each of the float valves sit along their respective support members downward away from their respective apertures 22, thereby permitting oil to flow through their respective inlet ports 24. An oil chamber 28 mounts over the baffle 10 to confine lubricating oil poured into an oil inlet 30 mounted above the oil chamber 28. The oil inlet 30 receives lubricating oil and it has a oil diverter 32 along an underside of the oil inlet 30 to direct lubricating oil flow out of the oil inlet 30 primarily into the secondary oil tank 8. The oil diverter 32 may be a simple aperture generally positioned over the float valve 12 for the secondary oil tank 8, but it most conveniently comprises an inclined surface 34 and a spout 36 along a lower part of the oil inlet 30 positioned over the float valve 12 for the secondary oil tank 8 to direct the lubricating oil primarily into the secondary oil tank 8. The spout 36 may conveniently comprise a spout-shaped oil filter comprising a course screen material. An oil hurdle 38 comprising a generally bulkhead-like structure mounted across the baffle 10 extending upward within the oil chamber 28 between the float valves 12 for the primary oil tank 6 and the secondary oil tank 8 serves to insure that the secondary oil tank 8 fills first.

Figure 3:
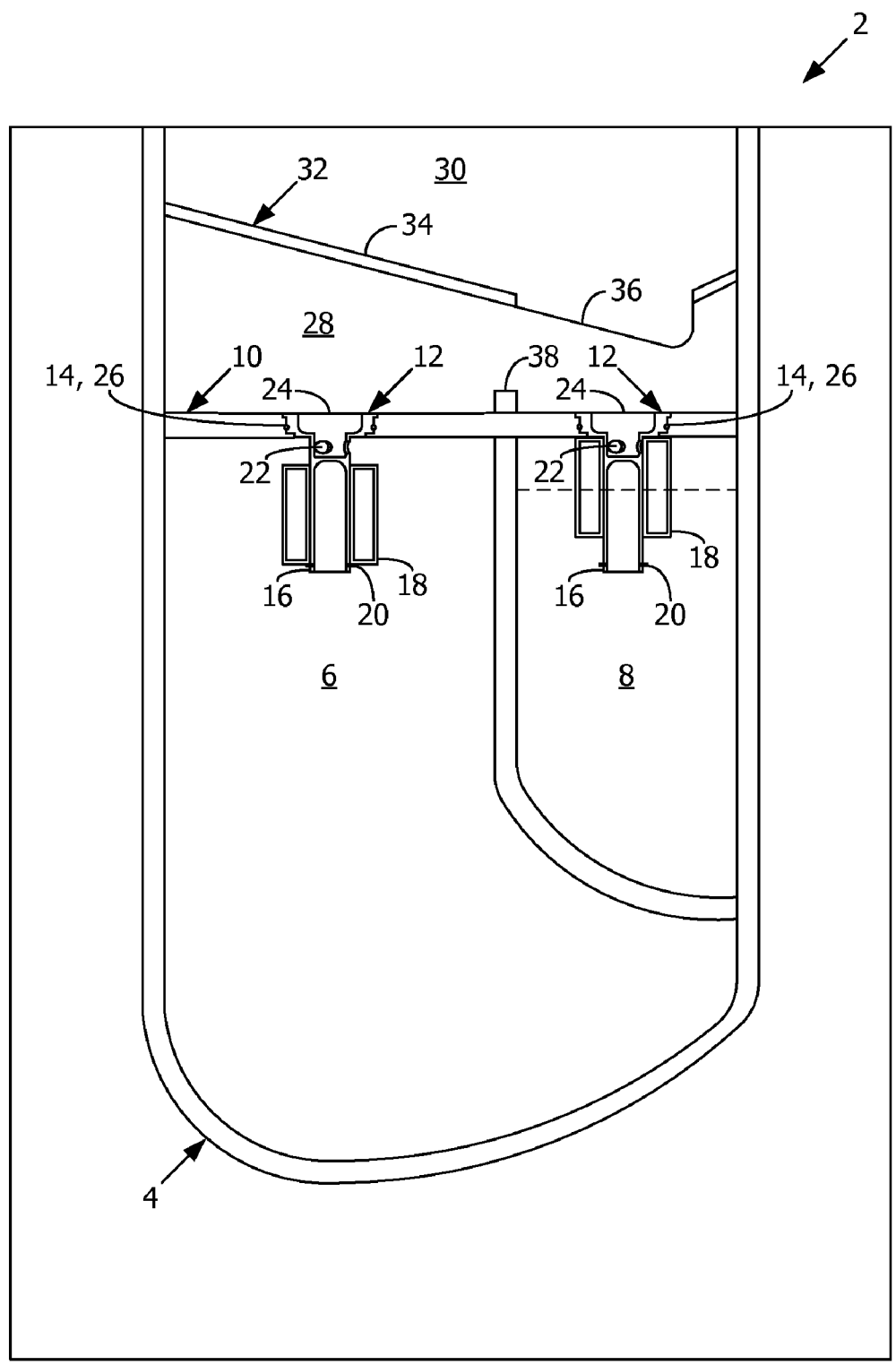
FIG. 3 is a cut-away side view of the gearbox that shows the primary oil tank only partially full and the secondary oil tank full.

FIG. 3 is a cut-away side view of the gearbox 2 that shows the primary oil tank 6 only partially full and the secondary oil tank 8 full. The float 16 for the float valve 12 in the secondary oil tank 8 now floats upward along the float support 18 due to the oil level in the secondary oil tank 8 to a position that covers the apertures 22 and block the communication of fluid flow between the inlet port 24 and the apertures 22, thus shutting the float valve 12 for the secondary oil tank 8. Oil then starts to fill the oil chamber 28 to a level that exceeds the height of the oil hurdle 38. As the oil spills over the oil hurdle 38, it begins to flow into the primary oil tank 6 by way of its float valve 12, which is still open.

Figure 4:
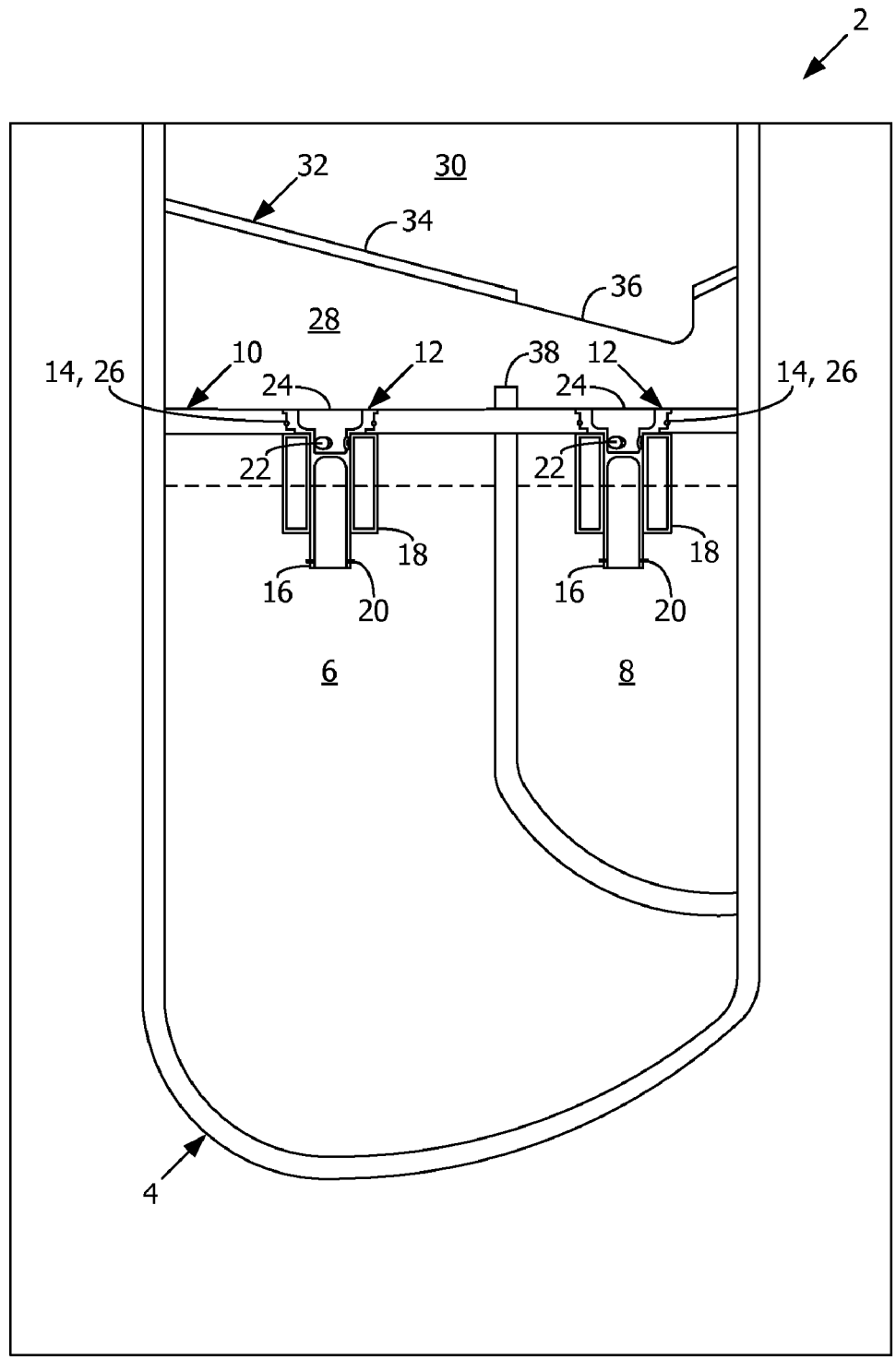
FIG. 4 is a cut-away side view of the gearbox that shows both the primary oil tank and the secondary oil tank full.

FIG. 4 is a cut-away side view of the gearbox 2 that shows both the primary oil tank 6 and the secondary oil tank 8 full. The float 16 for each of the float valves 12 in the primary oil tank 6 and the secondary oil tank 8 now floats upward along the float support 18 due to the oil level in the secondary oil tank 8 to a position that covers the apertures 22 and block the communication of fluid flow between the inlet port 24 and the apertures 22, thus shutting the float valves 12 in both the primary oil tank 6 and the secondary oil tank 8. Any additional flow of oil causes the oil chamber 28 to start to fill. If the oil chamber completely fills with oil, the oil level may increase to the point where it spills out of the inlet port 28, but it is thus impossible to overfill the primary tank 6 and the secondary tank 8. The oil inlet 30, the oil chamber 28 and the baffle 10 thus serve as a gravity oil fill system that directs oil primarily into the secondary oil tank 8 until the float valve 12 for the secondary oil tank 8 closes, so that once the secondary oil tank float valve 12 closes flow spills over the baffle 10 and pours into the primary oil tank 6 until the float valve 12 for the primary oil tank 6 closes, thereby preventing overfilling of either tank through the single oil fill port.

Described above is a twin lubrication oil tank filling system with a single oil fill port that prevents overfilling of both a primary oil and a secondary oil tank with a gravity fill system by directing oil primarily into the secondary oil tank by means of a special oil diverter, a float valve for the secondary oil tank that closes when the oil level in the secondary tank reaches a full level to cause additional oil flow to pour into the primary oil tank and a float valve for the primary oil tank that closes when the oil level in the primary tank reaches a full level. It should be understood that this embodiment is only an illustrative implementation of the invention, that the various parts and arrangement thereof may be changed or substituted, and that the invention is only limited by the scope of the attached claims.

What is claimed is:

1. A twin lubrication oil tank filling system with a single oil fill port that prevents overfilling of both a primary oil tank and a secondary oil tank, comprising:
    a float valve for the secondary oil tank to close oil flow into the secondary tank when the lubrication oil reaches a full level in the secondary tank;
    a gravity fill system comprising an oil diverter that diverts flow of the lubrication oil from the single oil port over the float valve for the secondary oil tank;
    a float valve for the primary oil tank to close oil flow into the primary oil tank when the lubrication oil reaches a full level in the primary oil tank; and
    a baffle plate that supports the float valve for the secondary oil tank and the float valve for the primary oil tank, collects the lubrication oil that spills onto the float valve for the secondary oil tank after the float valve for the secondary oil tank closes and directs the oil flow that the baffle plate collects to the float valve of the primary oil tank.

2. The twin lubrication oil tank filling system of claim 1, wherein the oil diverter comprises an aperture positioned over the float valve for the secondary oil tank for the entire filling operation of the secondary oil tank and the primary oil tank.

3. The twin lubrication oil tank filling system of claim 1, wherein the oil diverter comprises an inclined surface that directs oil flow from the single oil fill port to a spout positioned over the float valve for the secondary oil tank for the entire filling operation of the secondary oil tank and the primary oil tank.

4. The twin lubrication oil tank filling system of claim 1, further comprising a bulkhead-like structure mounted on the baffle plate between the float valve for the secondary oil tank and the float valve for the primary oil tank such that flow of oil on the baffle plate after the float valve for the secondary oil tank closes must reach a level that exceeds a height of the bulkhead-like structure to spill over the bulkhead-like structure to reach the float valve for the primary oil tank.

5. The twin oil tank filling system of claim 1, wherein the gravity fill system comprises an oil inlet and the oil diverter is located underside the oil inlet.

6. The twin oil tank filling system of claim 5, further comprising an oil chamber formed between the baffle plate and the oil diverter to retain excess lubrication oil poured into the oil inlet.

7. The twin oil tank filling system of claim 1, wherein each float valve comprises an external float.

8. The twin oil tank filling system of claim 7, wherein each float valve comprises a generally cylindrical support member comprising at least one aperture along an upper end of the support member that communicates with an inlet port of the float valve and the external float comprises a generally annular float that slides along the support member, wherein the external float covers the support member aperture as it rises toward the float valve inlet port to shut the float valve.

9. The twin oil tank filling system of claim 1, in combination with a primary oil tank and a secondary oil tank.

10. A twin lubrication oil tank filling system with a single oil fill port that prevents overfilling of both a primary oil tank and a secondary oil tank, comprising:
   an external float valve for the secondary oil tank to close oil flow into the secondary tank when lubrication oil reaches a full level in the secondary tank;
   a gravity fill system comprising an oil inlet with an oil diverter that diverts flow of lubrication oil from the single oil fill port over the float valve for the secondary oil tank and an oil chamber between the oil inlet and the primary and secondary oil tanks for retaining excess lubrication oil poured into the oil inlet;
   an external float valve for the primary oil tank to close oil flow into the primary tank when the lubrication oil reaches a full level in the primary oil tank; and
   a baffle plate that supports the float valve for the secondary oil tank and the float valve for the primary oil tank, collects the lubrication oil that spills onto the float valve for the secondary oil tank after the float valve for the secondary oil tank closes and directs the oil flow that the baffle plate collects to the float valve of the primary oil tank.

11. The twin lubrication oil tank filling system of claim 10, wherein the oil diverter comprises an aperture positioned over the float valve for the secondary oil tank for the entire filling operation of the secondary oil tank and the primary oil tank.

12. The twin lubrication oil tank filling system of claim 10, wherein the oil diverter comprises an inclined surface that directs oil flow from the single oil fill port to a stationary a spout positioned over the float valve for the secondary oil tank for the entire filling operation of the secondary oil tank and the primary oil tank.

13. The twin lubrication oil tank filling system of claim 10, further comprising a bulkhead-like structure mounted in the oil chamber on the baffle plate between the float valve for the secondary oil tank and the float valve for the primary oil tank such that flow of oil on the baffle plate after the float valve for the secondary oil tank closes must reach a level that exceeds a height of the bulkhead-like structure to spill over the bulkhead-like structure to reach the float valve for the primary oil tank.

14. The twin oil tank filling system of claim 10, wherein each external float valve comprises a generally cylindrical support member with at least one aperture that communicates with an inlet port of the float valve and a generally annular external float that slides along the support member, wherein the external float covers the support member aperture as it rises toward the float valve inlet port to shut the float valve.

15. The twin oil tank filling system of claim 10, in combination with a primary oil tank and a secondary oil tank.

* * * * *